April 12, 1966 P. CHOWDHURI 3,246,206
VOLTAGE SURGE PROTECTOR
Filed Feb. 25, 1965
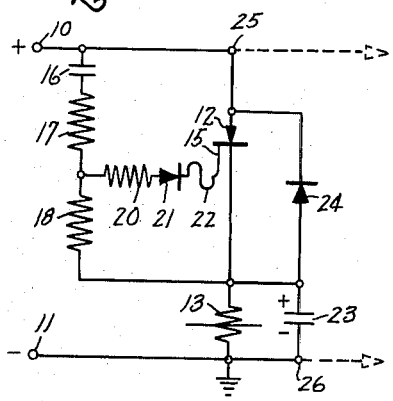
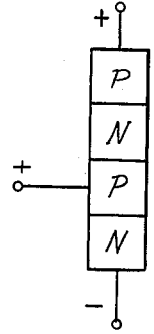
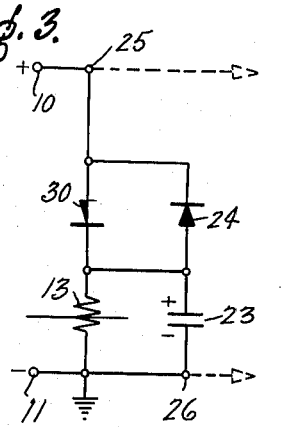
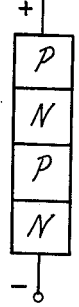
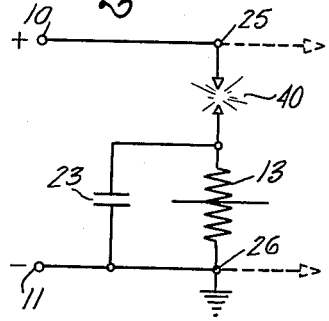
Inventor
Pritindra Chowdhuri
by Paul A. Frank
His Attorney United States Patent Office 3,246,206
Patented Apr. 12, 1966

3,246,206
VOLTAGE SURGE PROTECTOR
Pritindra Chowdhuri, Schenectady, N.Y., assignor to General Electric Company, a corporation of New York
Filed Feb. 25, 1965, Ser. No. 445,812
4 Claims. (Cl. 317—31)

This is a continuation-in-part of application Serial No. 105,657 filed April 26, 1961, now abandoned.

This invention relates to voltage surge protecting devices and more particularly, to such a device for a low voltage direct current supply.

Many of our modern power systems derive their energy from alternating current (A.C.) sources and in those instances where direct current (D.C.) sources are required, it is generally obtained by rectification from an A.C. source. In such D.C. systems, the surge protectors are generally connected on the A.C. side to protect the D.C. system from lightning and external switching surges. These systems have virtually no protection against surges caused by internal switching in the D.C. circuit and the margin of the breakdown voltage over the operating voltage for D.C. apparatus is relied upon for the protection against over-voltages caused by internal switching. Now, however, because of the use of solid state devices such as silicon diodes, silicon controlled rectifiers, transistors, etc. in D.C. systems, protection against internal overvoltage caused by switching poses a new problem. It is anticipated that these solid state devices have very little margin for breakdown voltage above the operating voltage level. Therefore, there is a real need for voltage surge protection against internal switching for D.C. systems using solid state devices at a relatively low voltage level.

Protection of a system against transient overvoltages, such as due to lightning and switching, requires that the protectors be able to reduce the transient overvoltages to safe values well below the breakdown level of the system and without causing a power outage. Therefore, a surge protector has three duties to perform. First, it should be able to "switch on" quickly in response to a transient overvoltage so that the protected system is not stressed beyond a safe value. Second, it should be able to "switch off" within a reasonably short period afterwards so that the power supply is not short circuited through the protecting device and a system outage does not occur. Third, it should be able to perform the two aforementioned duties repeatedly without being damaged. Therefore, it is the primary object of the present invention to provide a voltage surge protecting device which meets the three requirements mentioned above in direct current systems.

Various protective devices which have been used with A.C. power sources, are unsuitable for use with D.C. sources because the system power would continue to flow through them after the voltage surge or transient had passed. In an A.C. circuit, the protective device is, in effect, "turned off" as the voltage passes through zero, but this phenomenon cannot be used in a D.C. circuit. Therefore, it is another object of this invention to provide efficient and positive means to turn off the protective device to prevent the flow of system power therethrough with its consequent system outage.

It has been customary with low voltage D.C. systems to utilize capacitors, nonlinear resistors, or the parallel combination of both for surge protection. Although capacitors are effective for short duration surges, a very high value of capacitance would be required for a long duration surge and, theoretically, a capacitor can double the magnitude of an oncoming rectangular surge. A nonlinear resistor can effectively limit the voltage across the protected apparatus but if it is connected directly across the line, the nonlinear resistor is a constant source of power loss. Accordingly, it is another object of the present invention to provide a direct voltage surge protective device which does not draw power from the D.C. voltage source during normal operation by reason of being electrically isolated from the source during normal operation, and which does not increase the magnitude of the surge.

A further object of the present invention is to provide such a device which is economical to manufacture and which has extremely long life.

A still further object of this invention is to provide such a device whereby the flow of power from the voltage remains uninterrupted.

The stated objectives are achieved in accordance with the teachings of the invention by providing a calibrated switching device connected in series with nonlinear resistor means. Capacitor means connected across the nonlinear resistor means function to turn the protector off after a short time, so that it does not short circuit the voltage supply and cause a system outage.

Other objects, features, and advantages of this invention will be better understood by reference to the following detailed description, when considered in connection with the accompanying drawings, wherein like parts of each of the several figures are identified by the same reference characters, and wherein:

FIGURE 1 is a circuit diagram of one embodiment of the invention utilizing a silicon controlled rectifier;

FIGURE 2 is a schematic representation of a silicon controlled rectifier used in the circuitry of FIGURE 1;

FIGURE 3 is a circuit diagram of an embodiment of the invention utilizing a four layer Shockley diode;

FIGURE 4 is a schematic representation of the Shockley diode used in the embodiment shown in FIGURE 3; and FIGURE 5 is a circuit diagram of another embodiment of the invention utilizing a spark gap.

The basic elements of a D.C. voltage surge protective device are a diverting circuit consisting of a calibrated switching device in series with a resistor, and a commutating circuit which interrupts the diverting circuit after the surge is dissipated, so that the normal voltage output of the power supply will not be short circuited across the diverting circuit. The use of this diverter circuit assures that the flow of power from the power supply remains uninterrupted.

Each of the three illustrated embodiments of the present invention utilizes a different element as the calibrated switching device in the diverting circuit.

The embodiment of the invention shown in FIGURE 1 utilizes a silicon controlled rectifier as the calibrated switching device. A silicon controlled rectifier is essentially a PNPN semiconductor device having three rectifying junctions and having a third electrode, called the control gate, connected to the inner P-layer as shown in FIGURE 2. A silicon controlled rectifier does not conduct when a voltage less than its forward breakover voltage is applied in the conducting direction. However, if a small positive pulse of current is passed from the control gate element to the cathode, the rectifier conducts within a matter of a few microseconds and keeps on conducting even after its gate excitation is removed. The current flow through it can be arrested if it is held below its holding current level, which may be accomplished either by providing a reverse voltage applied between the anode and the cathode, or by placing a high resistance in series with the rectifier. Such silicon controlled rectifiers are manufactured by and commercially available from the General Electric Company.

FIGURE 1 illustrates one embodiment of the invention having a pair of input terminals 10 and 11 adapted to be connected across a direct current power supply (not shown). The switching portion of the circuit comprises a silicon controlled rectifier 12 and a nonlinear resistor 13 connected across the D.C. voltage supply. The silicon controlled rectifier 12 is of the type previously described with reference to FIGURE 2 and has a gate control element 15.

The nonlinear resistor 13, which is of a type well-known in the art, is characterized by current-voltage characteristics such that it presents a high resistance when a low voltage is impressed across it and a low resistance when a high voltage is impressed across it. More specifically, the current through such a resistance varies exponentially as a power of the voltage impressed thereacross. The exponent depends upon various factors in the manufacturing process, and will usually be at least 3.5, but in special cases may be as high as 7. Such nonlinear resistors are available commercially from the General Electric Company under the trademark "Thyrite" resistors.

The "turn on" portion of the circuit comprises a capacitor 16 connected in series with two voltage divider resistors 17 and 18 across the controlled rectifier 12. The capacitor 16 prevents the D.C. power voltage from appearing across the voltage divider consisting of resistors 13, 17 and 18. Of course, a transient against which protection is desired will be passed by the capacitor 16 and appear across the voltage divider resistors. The gate control element 15 of the silicon controlled rectifier 12 is connected to the junction of the voltage divider resistors 17 and 18 through a dropping resistor 20 and, for protection against a reverse voltage, through a diode rectifier 21 and a fuse 22. A capacitor 23 is connected across the nonlinear resistor 13 and a diode rectifier 24 is connected across the controlled rectifier 12 with opposite polarity.

In operation, the D.C. power supply voltage appearing across the silicon controlled rectifier 12 is less than its breakover voltage and, therefore, the rectifier 12 does not conduct. If, however, a positive transient or surge occurs, a portion of the surge voltage will appear across the voltage divider resistor 18 and will be applied to the gate control element 15 of the silicon controlled rectifier 12. That surge, or pulse, will cause the rectifier 12 to conduct and thus place a series circuit comprising the rectifier 12 and nonlinear resistor 13 in parallel with the load (not shown) connected between output terminals 25 and 26. Thus, the load and power supply are both protected from the voltage surge.

Because of the properties of silicon controlled rectifiers, the rectifier 12 will continue to conduct after the surge or transient has passed unless its conduction is cut off in some manner. To that end, the capacitor 23 is provided. During the passage of the surge current, the nonlinear resistor 13 offers a variable resistance to the current and the parallel capacitor 23 charges up to the voltage across the nonlinear resistor. Immediately after the voltage surge is over, the voltage on the capacitor is equal to the voltage drop across the nonlinear resistor 13 due to the transient. This voltage is higher than the system voltage; the resulting voltage across the controlled rectifier 12 is the algebraic difference between the voltage across the capacitor 23 and the system voltage, and is in a direction to oppose the flow of system current through the controlled rectifier 12. With time, the resultant voltage across the controlled rectifier 12 decreases as the capacitor 23 discharges through the nonlinear resistor 13. However, the resistance of the nonlinear resistor 13 increases as the capacitor voltage decreases, thus increasing the time constant of discharge of capacitor 23. This effect prolongs the reverse voltage applied across the controlled rectifier 12 and as a consequence the rectifier deionizes in a few microseconds. Upon deionization of rectifier 12, the voltage surge protective device is electrically isolated from the D.C. power supply during normal or nonsurge operation of the power system, thereby preventing any power drain by the protective device from the power supply during this normal operation.

The purpose of the diode rectifier 24 is twofold. It has been found that just after a positive pulse is applied to the gate control element 15 of the silicon controlled rectifier 12, and before the full conducting state of the rectifier begins, its anode is driven transiently negative with respect to its cathode due to the fast switching action. It is possible that at times this negative voltage may exceed the peak inverse voltage rating of the controlled rectifier and as a consequence it may be damaged. To prevent this, the diode rectifier 24 is connected across the controlled rectifier 12 with opposite polarity.

It can be appreciated from the hereinabove explanation of the operation of the voltage protective device that the flow of power from the D.C. power supply remains uninterrupted during both normal and surge (transient) operation of the power system.

The operation of the embodiment of the invention thus far described has assumed a voltage surge or transient having the same polarity as the system voltage. That is the worse case, because once the surge is over, the system current will continue to flow if not arrested by some external means. If a surge of the opposite polarity appears across the protecting device, the controlled rectifier 12 cannot protect the apparatus without itself being damaged. However, by placing the diode 24 across the controlled rectifier 12 the surge is bypassed and does not damage the controlled rectifier or the apparatus to be protected. In this case, no system current will flow through the diode because the diode is connected in the reverse direction.

Typical values for circuit components in a device designed to protect a 90 volt direct-current power supply are as follows:

Resistor 13 _____ ([1])
Capacitor 16, microfarad _____ 0.02
Resistor 17, ohms _____ 2500
Resistor 18, ohms _____ 200
Resistor 20, ohms _____ 100
Capacitor 23, microfarad _____ 0.5

[1] Two No. 3900353G1 Thyrite resistors (General Electric Co.).

FIGURE 3 shows a modification of the invention in which a Shockley diode 30 is connected in series with the nonlinear resistor 13 directly across the D.C. lines. The capacitor 23 is again connected across the nonlinear resistor 13, and the diode rectifier 24 is connected across the Shockley diode 30.

The construction of the Shockley diode, which is illustrated in FIGURE 4, is similar to that of a silicon controlled rectifier except that a Shockley diode does not have a third electrode or gate control element. Therefore, to switch on a Shockley diode, a pulse exceeding its breakover voltage must be applied to it momentarily. To switch it off, the flow of current must be limited below its holding current level either by inserting a high resistance in series with it or by placing a reverse voltage across it.

In the circuit shown in FIGURE 3, the Shockley diode is, of course, not conducting while the circuit is in normal operation and thus, the voltage protective device is electrically isolated from the D.C. power supply during normal or nonsurge operation of the power system. When a positive transient or surge voltage is applied which exceeds the breakover voltage of the Shockley diode 30, it conducts and the overvoltage is absorbed by the nonlinear resistor 13. As in the embodiment shown in FIGURE 1, the capacitor 23 charges up to the voltage that appears across the nonlinear resistor 13 and when the surge is over, the voltage applied across the Shockley diode 30 is the algebraic difference between the voltage appearing across the capacitor 23 and the system voltage. As previously explained, this voltage is in a direction opposing the flow of the system current through the Shockley diode 30, which after a short time deionizes the Shockley diode and system current no longer flows therethrough.

The diode 24 connected across the Shockley diode 30 serves the same purpose as in the embodiment described with reference to FIGURE 1. It serves to protect the Shockley diode against negative transients caused by fast switching action and also to protect it against voltage surges that oppose the system polarity.

FIGURE 5 illustrates a third embodiment of the invention in which a spark gap 40 serves as the calibrated switching device. As in the other embodiments the nonlinear resistor 13, shunted by the capacitor 23, is connected in series with the switching device across the D.C. line.

Calibrated gaps of a type suitable for this application are available commercially from a number of sources. For example, Bendix Aviation Corporation, among others, produces a line of calibrated gaps. The use of such a gap, rather than a rectifier as in the circuits of FIGURES 1 and 3, may be preferred when the protective device is to be used with D.C. power supplies having a voltage level that would require several rectifiers to be used in cascade.

In operation, the circuit shown in FIGURE 5 is similar to those previously discussed. When the breakdown voltage of the gap 40 is exceeded by a surge or transient, it conducts and the overvoltage is absorbed by the nonlinear resistor 13. The capacitor 23 charges up to the voltage appearing across the resistor 13 and, when the surge is over, it serves to quench the current flow across the gap 40. The value of the nonlinear resistor and the parallel capacitor is selected according to the maximum surge current expected, the desired potective level, and the deionization time of the switching device.

It is apparent that the device illustrated in FIGURE 5 will protect the system against both positive and negative surges and transients, and the nonlinear resistor 13 and capacitor 23 operate in the same manner in both cases.

It is now apparent that the invention attains all of the stated objectives. It "switches on" quickly in response to a transient or surge voltage to protect the system; it "switches off" quickly and positively after the surge is over to prevent system outage; it is able to switch on and off repeatedly without damage and permits the flow of power from the source to remain uninterrupted. Furthermore, it does not draw drain power from the source during normal operation by reason of being electrically isolated from the source during normal operation thereof; it is relatively inexpensive and has extremely long life.

Although several embodiments of the invention have been illustrated and described, it is apparent that one skilled in the art may make many modifications and changes. Therefore, the invention is to be limited only by the scope of the appended claims.

What I claim as new and desire to secure by Letters Patent of the United States is:

1. In a direct-voltage surge protector, the combination comprising a three-junction semiconductor device in series with the resistor means for connection across a voltage source, means connected to the voltage source and to said semiconductor device for causing said semiconductor device to conduct when a voltage surge appears across the source, and capacitor means connected across said resistor means for stopping the flow of current through said semiconductor device, said semiconductor device and means for causing said device to conduct thereby preventing any power drain by the voltage surge protector from the voltage source during nonconduction of said semiconductor device and power flowing from the voltage source remains uninterrupted.

2. In a direct-voltage surge protector, the combination comprising a three-junction semiconductor device in series with nonlinear resistor means for connection across a voltage source, means connected to the voltage source and to said semiconductor device for causing said semiconductor device to conduct when a voltage surge appears across the source, and capacitor means connected across said nonlinear resistor means for stopping the flow of current through said semiconductor device, said semiconductor device and means for causing said device to conduct thereby preventing any power drain by the voltage surge protector from the voltage source and electrically isolating the protector therefrom during nonvoltage surge operation of the voltage source.

3. In a direct-voltage surge protector, the combination comprising a three-junction semiconductor device in series with resistor means for connection across a voltage source, means connected to the voltage source and to said semiconductor device for causing said semiconductor device to conduct when a voltage surge appears across the source, capacitor means connected across said resistor means for stopping the flow of current through said semiconductor device, said semiconductor device and means for causing said device to conduct thereby preventing any power drain by the voltage surge protector from the voltage source during nonconduction of said semiconductor device, and diode rectifier means connnected with opposite polarity across said semiconductor device.

4. In a voltage-surge protector, the combination comprising a silicon controlled rectifier having a gate control element, nonlinear resistor means in series with said rectifier for connection across a voltage source, means connected to the voltage source and to said gate control element for causing said controlled rectifier to conduct in response to a voltage of predetermined amplitude appearing across the voltage source, and capacitor means connected across said nonlinear resistor means for stopping the flow of current through said controlled rectifier, said controlled rectifier and means for causing said controlled rectifier to conduct thereby preventing any power drain by the voltage surge protector from the voltage source during nonconduction of said controlled rectifier.

References Cited by the Examiner

UNITED STATES PATENTS

| 2,456,986 | 12/1948 | Paluev | 317—41.1 X |
| 2,907,922 | 10/1959 | Crowther | 315—340 |
| 3,085,190 | 4/1963 | Kearns et al. | 307—88.5 |

OTHER REFERENCES

IBM-Technical Disclosure Bulletin, "Overvoltage Protective Circuit," vol. 2, page 96, No. 4, December 1959.

SAMUEL BERNSTEIN, *Primary Examiner.*

J. D. TRAMMELL, *Assistant Examiner.*